(12) United States Patent
Kim et al.

(10) Patent No.: US 8,960,714 B2
(45) Date of Patent: Feb. 24, 2015

(54) SIDE CURTAIN AIRBAG AND AIRBAG SYSTEM COMPRISING THE SAME

(71) Applicant: Kolon Industries, Inc., Kwacheon, Kyungki-do (KR)

(72) Inventors: Jae-Hyung Kim, Gumi-si (KR); Hee-Jun Kim, Daegu (KR); Jung-Hoon Youn, Gumi-si (KR); Sang-Kil Lee, Geumsan-gun (KR); Dong-Jin Kwak, Daegu (KR); Ki-Jeong Kim, Yeongcheon-si (KR); Sang-Mok Lee, Gumi-si (KR)

(73) Assignee: Kolon Industries, Inc., Kwacheon (KR)

(*) Notice: Subject to any disclaimer, the term of this patent is extended or adjusted under 35 U.S.C. 154(b) by 0 days.

(21) Appl. No.: 13/909,374

(22) Filed: Jun. 4, 2013

(65) Prior Publication Data

US 2013/0280444 A1    Oct. 24, 2013

Related U.S. Application Data

(63) Continuation-in-part of application No. 12/934,470, filed as application No. PCT/KR2009/001545 on Mar. 26, 2006, now abandoned.

(30) Foreign Application Priority Data

Mar. 26, 2008  (KR) ........................ 10-2008-0027779

(51) Int. Cl.
*B60R 21/232*    (2011.01)
*B60R 21/231*    (2011.01)
*B60R 21/235*    (2006.01)

(52) U.S. Cl.
CPC . *B60R 21/23138* (2013.01); *B60R 2021/23561* (2013.01); *B60R 2021/23595* (2013.01);

(Continued)

(58) Field of Classification Search
CPC ................. B60R 21/231; B60R 2021/23595; B60R 2021/23571; B60R 2021/23576; B60R 2021/23561; B60R 2021/23316; B60R 2021/2358
USPC ........................... 280/730.2, 736, 741, 743.1
See application file for complete search history.

(56) References Cited

U.S. PATENT DOCUMENTS

| 5,114,180 | A | 5/1992 | Kami et al. |
| 6,382,669 | B2 | 5/2002 | Tanabe et al. |

(Continued)

FOREIGN PATENT DOCUMENTS

| EP | 0 962 363 A1 | 12/1999 |
| EP | 1 179 454 A2 | 2/2002 |

(Continued)

*Primary Examiner* — Keith Frisby
(74) *Attorney, Agent, or Firm* — Sughrue Mion, PLLC (57) ABSTRACT

Disclosed is a side curtain airbag and an airbag system including the same. The side curtain airbag according to the present invention comprises an inflating part having gas inflation, a non-inflating part supporting the inflating part, and an adhered part constituting a boundary between the inflating part and the non-inflating part. The adhered part is coated with a seam sealant and sewed. The initial maximum pressure of the inflating part is 40 kPa or more when injecting a gas therein with an instant pressure of at least 10 bar, and the pressure after 6 seconds is 25 kPa or more. The side curtain airbag may optimize to apply the method of seam sealant coating and sewing on the adhered part constituting a boundary between the inflating part and the non-inflating part. Thus, it can keep the internal gas pressure of the airbag to the extent of protecting passengers safely at rollover.

11 Claims, 2 Drawing Sheets

(52) U.S. Cl.
CPC .............. *B60R21/231* (2013.01); *B60R 21/232* (2013.01); *B60R 21/235* (2013.01); *B60R 2021/23514* (2013.01)
USPC .................................... 280/730.2; 280/743.1

(56) References Cited

U.S. PATENT DOCUMENTS

| | | | |
|---|---|---|---|
| 6,502,853 | B2 | 1/2003 | Keshavaraj |
| 6,749,220 | B1 | 6/2004 | Wipasuramonton et al. |
| 6,886,857 | B1 | 5/2005 | Mishina et al. |
| 2002/0020992 | A1 | 2/2002 | Kanuma |
| 2002/0195808 | A1 | 12/2002 | Chiou et al. |
| 2006/0163853 | A1 | 7/2006 | Keshavaraj |
| 2008/0042414 | A1 | 2/2008 | Nagaoka |

FOREIGN PATENT DOCUMENTS

| | | |
|---|---|---|
| EP | 1 291 248 A2 | 3/2003 |
| EP | 1 736 378 A1 | 12/2006 |
| WO | 02/066297 A1 | 8/2002 |

SIDE CURTAIN AIRBAG AND AIRBAG SYSTEM COMPRISING THE SAME

CROSS-REFERENCE TO RELATED APPLICATIONS

This application is a continuation-in-part of U.S. application Ser. No. 12/934,470 filed Sep. 24, 2010 (pending), which is a National Stage of International Application No. PCT/KR2009/001545 filed Mar. 26, 2009, claiming priority based on Korean Patent Application No. 10-2008-0027779 filed Mar. 26, 2008, the contents of all of which are incorporated herein by reference in their entirety.

BACKGROUND OF THE INVENTION (a) Field of the Invention

The present invention relates to a side curtain airbag, which prevents passengers from being injured by side windows or car frames at rollover, and an airbag system comprising the same.

(b) Description of the Related Art

Generally, an airbag is the device that protects a driver and passengers. When a car collides head-on at 40 km/h or more, an impact sensor of the airbag reacts to collision and makes a powder explosion. It puts gas into inside of the airbag and makes the airbag expand.

Especially, a side curtain airbag is the airbag installed in a side window or side car frames to prevent passengers from colliding with side windows or car frames at rollover.

In order to minimize the secondary impact to passengers caused by the airbag and get a driver's view, an ordinary airbag installed in the front side of a car interior should expand quickly by an explosive gas and discharge the gas in a short time. For these, the ordinary airbag mostly has a hole for discharging the gas.

However, the side curtain airbag is a device that prevents passengers from being injured by side windows or car frames at rollover. Thus, the side curtain airbag must remain inflated and support passenger's head safely for at least 6 second at rollover. For these, the gas should not excessively leak out from a sewed part and a fabric of the airbag. Thus, the side curtain airbag doesn't have the hole for discharging the gas in general.

In order to prevent discharging excessive gas in the sewed part, U.S. Pat. No. 5,685,347 discloses a preparing method of a OPW (One Piece Woven) airbag that simultaneously weaves upper and lower fabric in a single piece having an inflating part therein with jacquard loom. However, the method needs the jacquard loom with an expensive electronic device and has a difficulty to input patterns for weaving. Moreover, the OPW airbag has another problem that the fabric cannot be used as an airbag fabric in case of only a defect while weaving.

Furthermore, JP Patent Publication NOs. 1992-081342, 1992-197848, and 1991-010946 disclose a process that seals a sewed part by an adhesive tape and so forth after sewing a fabric coated with rubber materials, in order to prevent leakage of the gas from the sewed part in an airbag. However, the method has problems, such as having complicated process and increasing the cost for preparation because of additional sealing process.

Therefore, a study for developing the side curtain airbag, which has an excellent capacity of keeping an internal gas pressure to the extent of protecting passengers safely at rollover, is required. In addition, it is required that the cost for preparation of the side curtain airbag is lowered and the side curtain airbag is efficiently prepared through an ordinary weaving, cutting, and sewing process.

SUMMARY OF THE INVENTION

The present invention provides a side curtain airbag, which has an excellent capacity of keeping an internal gas pressure, and an airbag system comprising the same.

The side curtain airbag according to the present invention comprises an inflating part having gas inflation, a non-inflating part supporting the inflating part, and an adhered part constituting a boundary between the inflating part and the non-inflating part. In the side curtain airbag, the adhered part is coated with a seam sealant in the amount of 35 $g/m^2$ to 150 $g/m^2$ to have a thickness in range of 0.5 mm to 1.3 mm and a width in range of 7 mm to 12 mm, and sewed with a thread having 420 to 1260 deniers to have a stitch number in range of 30 stitches/100 mm to 55 stitches/100 mm. The seam sealant is room temperature vulcanizable and two-component liquid type. Also, the initial maximum pressure of the inflating part is 40 kPa or more when injecting a gas therein with an instant pressure of at least 10 bar, and the pressure after 6 seconds is 25 kPa or more.

The present invention also provides an airbag system comprising the side curtain airbag.

EXPLANATION OF SIGNS IN FIGURES

1. The side curtain airbag
2. The adhered part
3. Seam sealant
4a. The upper fabric of the inflating part
4b. The lower fabric of the inflating part
5. The thread sewed in the adhered part

DETAILED DESCRIPTION OF THE EMBODIMENTS

Hereinafter, the side curtain airbag according to detailed embodiments of the present invention, the method of preparing the same, and the airbag system comprising the same are explained in more detail. However, they are merely presented as an example of the present invention, and thus it is clearly understood to a person skilled in the art that the scope of the present invention is not limited to the detailed embodiments and various modifications and executions are possible according to the embodiments within the scope of the present invention.

Although the present invention is explained based on the side curtain airbag, it is not limited to it and can be also applied to a driver seat airbag, a passenger's seat airbag, a side airbag, a knee air bag, and air bag for protecting a pedestrian.

The side curtain airbag according to the present invention comprises an inflating part having gas inflation, a non-inflating part supporting the inflating part, and an adhered part constituting a boundary between the inflating part and the non-inflating part. In the side curtain airbag, the adhered part is coated with a seam sealant in the amount of 35 g/m² to 150 g/m² to have a thickness in range of 0.5 mm to 1.3 mm and a width in range of 7 mm to 12 mm, and sewed with a thread having 420 to 1260 deniers to have a stitch number in range of 30 stitches/100 mm to 55 stitches/100 mm. The seam sealant is room temperature vulcanizable and two-component liquid type. Also, the initial maximum pressure of the inflating part is 40 kPa or more when injecting a gas therein with an instant pressure of at least 10 bar, and the pressure after 6 seconds is 25 kPa or more.

Especially, it is optimized and applied in the present invention that the method of sewing and seam sealant coating on the adhered part between the inflating part and the non-inflating part in preparing the side curtain airbag. Thus, it improves a capacity of preventing air leak, air tightness, and seam strength so as to display a good performance of spreading out.

Firstly, an embodiment of the present invention is explained in more detail with reference to the figures annexed so that a person having ordinary skill in the art easily practices it.

Figure 1:
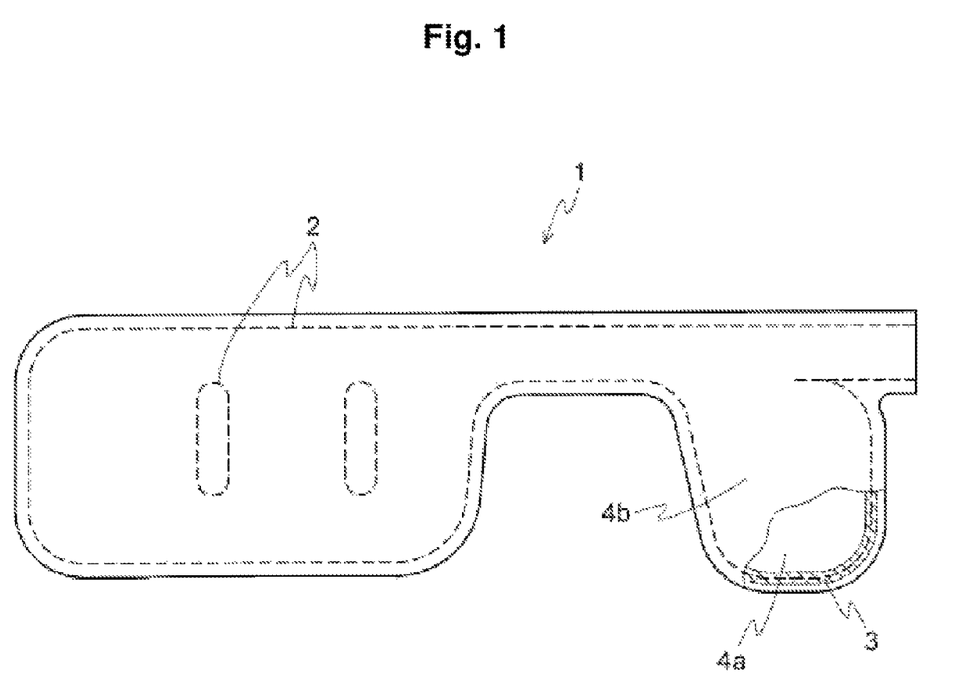
FIG. 1 shows a schematic view of the side curtain airbag according to an embodiment of the present invention.
Figure 2:
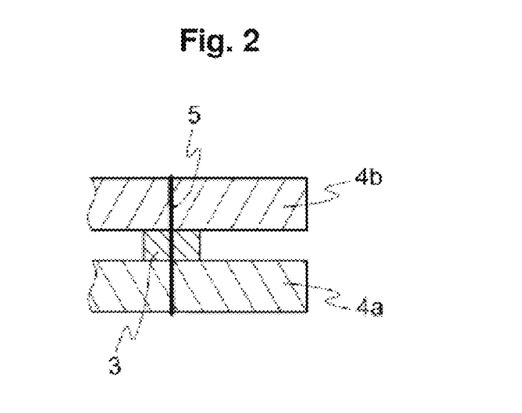
FIG. 2 schematically shows a sectional structure of the adhered part 2 of the side curtain airbag according to an embodiment of the present invention.

FIG. 1 shows a schematic view of the side curtain airbag according to an embodiment of the present invention. FIG. 2 schematically shows a sectional structure of the adhered part 2 of the side curtain airbag according to an embodiment of the present invention.

As shown in FIG. 1, the side curtain airbag 1 according to the present invention comprises an outer inflating part and an inner non-inflating part. The inflating part 4a, 4b, which comprises 2 pieces of a fabric, is attached in the adhered part 2. In other words, as shown in FIG. 2, the upper fabric 4a and the lower fabric 4b of the inflating part are adhered to each other with seam sealant 3 and sewed with the thread 5.

The adhered part constitutes a boundary between the inflating part having gas inflation and the non-inflating part supporting the inflating part in the airbag. The adhered part keeps the gas in the inflating part and stands the pressure of the inflating gas, when the airbag is spreading out. Especially, the present invention simultaneously uses the seam sealant 3 and the method of sewing with the thread 5 on the adhered part 2 as shown FIG. 2.

Furthermore, the side curtain air bag according to the present invention usually comprises a woven fabric. The fabric may be at least one selected from the group consisting of nylon fabric, polyester fabric, polyphenylene sulfide (PPS) fabric, polyethylene 2,6-naphthalate (PEN) fabric, and aramid fabric, though the kind of the fabric used in the present invention is not limited thereto. However, Nylon 66 fabric is preferable in considering the properties that is required for an airbag fabric, such as low air permeability, high strength, high thermal resistance, good folding property, good maintenance rate of the tensile strength and thermal aging property under the long term of high temperature or high humidity condition, and good self-extinguishing and energy-absorbing property that prevents secondary injury when the airbag is spreading out. Moreover, the fabric may be further treated with thermal stabilizer, antioxidant, flame retardant, and anti-electrostatic agent.

The fabric of the side curtain airbag may comprise a fiber having a fineness of 210 to 840 deniers, and preferably 315 to 525 deniers. And a filament number of the fiber may be 60 to 200, and preferably 60 to 150. Moreover, a tensile strength of the fiber may be 7.0 to 10.0 g/d, and preferably 8.2 to 9.5 g/d and the thermal shrinkage property of the fiber may be 6 to 7%. However, the characteristic of the fiber is not limited thereto.

The side curtain airbag according to the present invention may comprise a fabric prepared through ordinary beaming of weft and warp, weaving, scouring, and tendering process. Especially, since the airbag may comprise plain weave fabric obtained by using Rapier loom, Air jet loom or Water jet loom, instead of OPW (One Piece Woven) fabric that requires a Jacquard loom having complicated structure, the preparation process of the airbag can be simplified and the cost for the preparation can also be decreased.

Furthermore, the fabric for the airbag according to the present invention may be coated with a rubber material in order to lower air permeability. The side curtain airbag of the present invention comprises two pieces of fabrics. The rubber material may be any material that is usually used in textile coating. And, it is preferable that the rubber material comprises Powder-type silicone, liquid-type silicone, or a mixture thereof for air tightness and maintenance of the strength at spreading out of the airbag.

The coating of the rubber material is for improving a tearing strength of the airbag fabric and blocking air permeation from the surface of the plain fabric. Moreover, it is for improving air tightness and adhering property by chemical bonding with sealant of the adhered part 2 as shown FIG. 2. The rubber material is coated throughout the whole airbag fabric. The usual coating method, such as knife over roll coating, doctor blade coating, or spray coating, may be applied, and it is preferable to use knife over roll coating.

The coating amount of the rubber material is preferably 20 g/m² to 100 g/m², more preferably 20 g/m² to 60 g/m², and most preferably 25 g/m² to 40 g/m². In case that the coating amount of the rubber material is less than 20 g/m², it is hard to maintain an uniform gas pressure in the airbag for 6 second or more because of excessive airing. In case that the coating amount of the rubber material is more than 100 g/m², the airbag has a bad folding property because of massive thickness.

Furthermore, the adhered part is prepared by attaching the upper and the lower fabrics of the airbag, coated with the rubber material respectively. In particular, the upper and the lower fabrics is attached by coating of a seam sealant at the adhered part, where needs to be sewed. The coating method of the seam sealant may be usual screen print method. However, 3-axis automatic robot dispensing system is preferably applied in the coating method considering figure of the side curtain airbag having various adhered parts, the inflating part, and the non-inflating part, although it is not limited thereto.

The seam sealant may comprise room temperature vulcanizable silicone resin, which is two-component liquid type. The coating amount of the seam sealant on the adhered part is preferably 35 g/m² to 150 g/m², more preferably 35 g/m² to 130 g/m², and most preferably 40 g/m² to 110 g/m² so that the side curtain airbag according to the present invention has better folding property, tearing strength, capacity of keeping the internal gas pressure, and interfacial adhesion.

A thickness of the coated seam sealant may be varied considering an air tightness of the adhered part, especially around an area that needs to be sewed. The thickness is preferably 0.5 mm to 1.3 mm, and more preferably 0.5 mm to 1.0 mm. And, it is preferable to keep a uniform thickness throughout the adhered part. However, in case that the thickness of the coated seam sealant is less than 0.5 mm, an interfacial separation between the surface of the airbag and the coated seam sealant easily happens when the airbag spreads out. Moreover, it is not preferable because the tearing strength and the maintenance rate of the internal gas pressure are lowered. On the other hand, in case that the thickness of the coated seam sealant is more than 1.3 mm, it is not preferable because of a bad folding property of the airbag.

Furthermore, a width of the coated seam sealant may be varied considering an air tightness of the adhered part, especially around an area that needs to be sewed. The width is preferably 7 mm to 12 mm, and more preferably 8 mm to 10 mm. And, it is preferable to keep a uniform width throughout the adhered part. However, in case that the width of the coated seam sealant is less than 7 mm, an interfacial separation between the surface of the airbag and the coated seam sealant easily happens when the airbag spreads out. Moreover, it is not preferable because the tearing strength and the maintenance rate of the internal gas pressure are lowered. On the other hand, in case that the width of coated the seam sealant is more than 12 mm, it is not preferable because of a bad folding property of the airbag.

In the side curtain airbag according to the present invention, the seam sealant may comprise some ingredients in a composition. The seam sealant may be a curable sealant composition, for example, a hydrosilylation reaction curable polyorganosiloxane composition.

The curable sealant composition may be a curable polyorganosiloxane composition which is flowable at 25° C. and which cures to form an elastomer upon heating. An exemplary hydrosilylation reaction curable polyorganosiloxane composition comprises: (A) a polyorganosiloxane having an average, per molecule, of at least two organic groups having terminal aliphatic unsaturation; (B) a crosslinker having an average per molecule of at least two silicon-bonded hydrogen atoms; (C) a filler; and (D) a hydrosilylation catalyst.

Ingredient (A) is a polyorganosiloxane having an average, per molecule, of at least two organic groups having terminal aliphatic unsaturation. The aliphatically unsaturated organic groups in ingredient (A) may be alkenyl exemplified by, but not limited to, vinyl, allyl, butenyl, pentenyl, and hexenyl, alternatively vinyl. The aliphatically unsaturated organic groups may be alkynyl groups exemplified by, but not limited to, ethynyl, propynyl, and butynyl. The aliphatically unsaturated organic groups in ingredient (A) may be located at terminal, pendant, or both terminal and pendant positions. The remaining silicon-bonded organic groups in ingredient (A) may be other monovalent hydrocarbon groups, which may be substituted or unsubstituted. Monovalent unsubstituted hydrocarbon groups are exemplified by, but not limited to alkyl groups such as methyl, ethyl, propyl, pentyl, octyl, dodecyl, and octadecyl; aromatic groups such as ethylbenzyl, naphthyl, phenyl, tolyl, xylyl, benzyl, styryl, 1-phenylethyl, and 2-phenylethyl, alternatively phenyl; and cycloalkyl groups such as cyclohexyl. Monovalent substituted hydrocarbon groups are exemplified by, but not limited to halogenated alkyl groups such as chloromethyl, 3-chloropropyl, and 3,3, 3-trifluoropropyl, fluoromethyl, 2-fluoropropyl, 3,3,3-trifluoropropyl, 4,4,4-trifluorobutyl, 4,4,4,3,3-pentafluorobutyl, 5,5,5,4,4,3,3-heptafluoropentyl, 6,6,6,5,5,4,4,3,3-nonafluorohexyl, and 8,8,8,7,7-pentafluorooctyl.

Ingredient (A) may have unit formula (I): $(R^1SiO_{3/2})_a (R^1{}_2SiO_{2/2})_b(R^1{}_3SiO_{1/2})_c(SiO_{4/2})_d(XO_{1/2})_e$. In this formula, each $R^1$ is independently an aliphatically unsaturated organic group or a monovalent hydrocarbon group as described above, with the proviso that on average at least two $R^1$ per molecule are aliphatically unsaturated organic groups. X is a hydrogen atom or a monovalent hydrocarbon group, subscript a is 0 or a positive number, subscript b is a positive number, subscript c is 0 or a positive number, subscript d is 0 or a positive number, and subscript e is 0 or a positive number.

Ingredient (A) may comprise a polydiorganosiloxane of general formula (II): $R^1{}_3SiO\text{—}(R^1{}_2SiO)_f\text{—}SiR^1{}_3$, where $R^1$ is as described above, and subscript f is an integer having a value sufficient to provide ingredient (A) with a viscosity ranging from 140,000 to 300,000 cps at 25° C. Alternatively, formula (II) is an α,ω-dialkenyl-functional polydiorganosiloxane such as dimethylvinylsiloxy-terminated polydimethylsiloxane.

Ingredient (A) is exemplified by dimethylvinylsiloxy-terminated polydimethylsiloxane, trimethylsiloxy-terminated, poly(dimethylsiloxane/methylvinylsiloxane), and polyorganosiloxanes comprising siloxane units of the formulae $(CH_3)_3SiO_{1/2}$, $(CH_3)_2CH=CHSiO_{1/2}$, and $SiO_{4/2}$. Ingredient (A) can be one polyorganosiloxane or a combination comprising two or more polyorganosiloxanes that differ in at least one of the following properties: structure, viscosity, average molecular weight, siloxane units, and sequence. The composition may contain 100 parts by weight of ingredient (A).

Ingredient (B) is a crosslinker having an average, per molecule, of more than two silicon bonded hydrogen atoms. Ingredient (B) may have unit formula (III): $(R^2SiO_{3/2})_h (R^2{}_2SiO_{2/2})_i(R^2{}_3SiO_{1/2})_j(SiO_{4/2})_k(XO)_m$, where each $R^2$ is independently a hydrogen atom or a monovalent substituted or unsubstituted hydrocarbon group as exemplified above, X is as described above, subscript h is a positive number, subscript i is a positive number, subscript j is 0 or a positive number, subscript k is 0 or a positive number, and subscript m is 0 or a positive number.

Ingredient (B) may comprise a polydiorganohydrogensiloxane of general formula (IV): $HR^3{}_2SiO\text{—}(R^3{}_2SiO)_g\text{—}SiR^3{}_2H$, where each $R^3$ is independently a hydrogen atom or a monovalent substituted or unsubstituted hydrocarbon group as exemplified above, and subscript g is an integer with a value of 1 or more. Alternatively, ingredient (B) may comprise hydrogen-terminated dimethylsiloxane, trimethylsiloxy-terminated poly(dimethyl/methylhydrogen siloxane), or a combination thereof.

Ingredient (B) can be one crosslinker or a combination comprising two or more crosslinkers that differ in at least one of the following properties: structure, viscosity, average molecular weight, siloxane units, and sequence. The amount of ingredient (B) may be selected such that the molar ratio of silicon bonded hydrogen atoms to aliphatically unsaturated organic groups ranges from 1:100 to 20:1 in this composition.

Ingredient (C) is a filler. Ingredient (C) may comprise a reinforcing filler, an extending filler, or a combination thereof. The reinforcing filler may be added in an amount ranging from 5 to 200 parts based on 100 parts of ingredient (A). Examples of suitable reinforcing fillers include reinforcing silica fillers such as fume silica, silica aerogel, silica zerogel, and precipitated silica. Fumed silicas are known in the art and commercially available; a fumed silica is sold under the name CAB-O-SIL by Cabot Corporation of Massachusetts, U.S.A.

The extending filler may be added to the composition in an amount ranging from 5 to 200 parts based on 100 parts of ingredient (A). Examples of extending fillers include glass beads, quartz, aluminum oxide, magnesium oxide, calcium carbonate, zinc oxide, talc, diatomaceous earth, iron oxide, clays, titanium dioxide, zirconia, sand, carbon black, graphite, or a combination thereof. Extending fillers are known in the art and commercially available; such as a ground silica sold under the name MIN-U-SIL by U.S. Silica of Berkeley Springs, West Va., U.S.A.

Ingredient (D) is a hydrosilylation catalyst Ingredient (D) is added in an amount sufficient to promote curing of the composition. The exact amount depends on the specific catalyst selected; however, ingredient (D) may be added in an amount sufficient to provide 0.01 to 500 ppm of platinum group metal, based on 100 parts of ingredient (A).

Suitable hydrosilylation catalysts are known in the art and commercially available. Ingredient (D) may comprise a platinum group metal selected from the group consisting of platinum, rhodium, ruthenium, palladium, osmium or iridium metal or organometallic compound thereof, and a combination thereof. Ingredient (D) is exemplified by platinum black, compounds such as chloroplatinic acid, chloroplatinic acid hexahydrate, a reaction product of chloroplatinic acid and a monohydric alcohol, platinum bis-(ethylacetoacetate), platinum bis-(acetylacetonate), platinum dichloride, and complexes of said compounds with olefins or low molecular weight polyorganosiloxanes or platinum compounds microencapsulated in a matrix or coreshell type structure. Complexes of platinum with low molecular weight polyorganosiloxanes include 1,3-diethenyl-1,1,3,3-tetramethyldisiloxane complexes with platinum. These complexes may be microencapsulated in a resin matrix. Alternatively, the catalyst may comprise 1,3-diethenyl-1,1,3,3-tetramethyldisiloxane complex with platinum. When the catalyst is a platinum complex with a low molecular weight polyorganosiloxane, the amount of catalyst may range from 0.02 to 0.2 parts based on the weight of the composition.

Suitable hydrosilylation catalysts for ingredient (D) are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are also known in the art, as exemplified in U.S. Pat. No. 4,766,176; and U.S. Pat. No. 5,017,654.

The hydrosilylation curable polyorganosiloxane composition described above may further comprise an additional ingredient selected from the group consisting of (E) a filler treating agent, (F) an adhesion promoter, (G) a pigment, (H) a cure modifier, (J) a nonreactive resin, and a combination thereof, provided however that any additional ingredients and amounts added do not render the composition incapable of curing to form an elastomer suitable for use in an airbag.

The composition may optionally further comprise ingredient (E), a filler treating agent in an amount ranging from 0 to 1 part based on 100 parts of ingredient (A). Ingredient (C) may optionally be surface treated with ingredient (E). Ingredient (C) may be treated with ingredient (E) before being added to the composition, or in situ. Ingredient (E) may comprise a silane such as an alkoxysilane, an alkoxy-functional oligosiloxane, a cyclic polyorganosiloxane, a hydroxyl-functional oligosiloxane such as a dimethyl siloxane or methyl phenyl siloxane, a stearate, or a fatty acid. Examples of silanes include hexamethyldisilazane. Examples of stearates include calcium stearate. Examples of fatty acids include stearic acid, oleic acid, palmitic acid, tallow, coco, and combinations thereof. Examples of filler treating agents and methods for their use are disclosed in, for example, EP 1 101 167 A2 and U.S. Pat. Nos. 5,051,455, 5,053,442, and 6,169,142 (col. 4, line 42 to col. 5, line 2).

Ingredient (F) is an adhesion promoter, as described below for ingredient (V). Ingredient (F) may be added in an amount ranging from 0.01 to 10 parts based on 100 parts of ingredient (A).

Ingredient (G) is a pigment. Examples of suitable pigments include iron (III) oxide, titanium dioxide, or a combination thereof. Ingredient (G) may be added in an amount ranging from 0 to 0.5 parts based on the 100 parts of ingredient (A).

Ingredient (H) is a cure modifier. Ingredient (H) can be added to extend the shelf life or working time, or both, of the hydrosilylation curable polyorganosiloxane composition. Ingredient (H) can be added to raise the curing temperature of the composition. Ingredient (H) may be added in an amount ranging from 0.01 to 5 parts based on 100 parts of ingredient (A).

Suitable cure modifiers are known in the art and are commercially available. Ingredient (H) is exemplified by acetylenic alcohols, alkyl alcohols, cycloalkenylsiloxanes, ene-yne compounds, triazoles, phosphines, mercaptans, hydrazines, amines, fumarates, maleates, and combinations thereof.

Examples of acetylenic alcohols are disclosed, for example, in EP 0 764 703 A2 and U.S. Pat. No. 5,449,802 and include methyl butynol, ethynyl cyclohexanol, dimethyl hexynol, 1-butyn-3-ol, 1-propyn-3-ol, 2-methyl-3-butyn-2-ol, 3-methyl-1-butyn-3-ol, 3-methyl-1-pentyn-3-ol, 3-phenyl-1-butyn-3-ol, 4-ethyl-1-octyn-3-ol, 3,5-dimethyl-1-hexyn-3-ol, and 1-ethynyl-1-cyclohexanol, and combinations thereof.

Examples of alkyl alcohols include ethanol, isopropanol, or combinations thereof.

Examples of cycloalkenylsiloxanes include methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and combinations thereof. Examples of ene-yne compounds include 3-methyl-3-penten-1-yne, 3,5-dimethyl-3-hexen-1-yne, and combinations thereof. Examples of triazoles include benzotriazole. Examples of phosphines include triphenylphosphine. Examples of amines include tetramethyl ethylenediamine. Examples of fumarates include dialkyl fumarates, dialkenyl fumarates, dialkoxyalkyl fumarates, and combinations thereof. Suitable cure modifiers are disclosed by, for example, U.S. Pat. Nos. 3,445,420; 3,989,667; 4,584,361; and 5,036,117.

Alternatively, ingredient (H) may comprise a silylated acetylenic inhibitor. A silylated acetylenic inhibitor is a reaction product of a silane and an acetylenic alcohol, described above. Examples of silylated acetylenic inhibitors and methods for their preparation are disclosed, for example, in EP 0 764 703 A2 and U.S. Pat. No. 5,449,802.

Ingredient (J) is a resin that may be added in addition to or instead of the filler. Nonreactive means that the resin does not participate in the curing reaction with ingredients (A) or (B). The nonreactive resin may be a polyorganosiloxane comprising siloxane units of the formulae $(CH_3)_3SiO_{1/2}$ and $SiO_{4/2}$ (MQ resin). Ingredient (J) may be added in an amount ranging from 0 to 30 based on 100 parts of ingredient (A).

The curable sealant composition may be prepared as a one-part composition or as a multiple part composition. In a multiple part composition, such as a two-part composition, ingredients (B) and (D) are stored in separate parts, which are combined shortly before step 1 in the process described above.

The tensile strength of the seam sealant may be at least 4 MPa or 4 to 5.0 MPa, preferably at least 4.2 MPa. The elongation of the seam sealant may be at least 1,000% or 1,000% to 1,500%, preferably at least 1,200%. The viscosity of the seam sealant may be 170,000 to 250,000 cps, preferably 200,000 to 240,000 cps. The pot life of the seam sealant may be 40 to 80 min, preferably 55 to 65 min. The curing time of the seam sealant may be 18 to 30 hr, preferably 20 to 28 hr, at room temperature (25° C.).

The side curtain airbag according to the present invention is prepared by simultaneously applying the method of coating the adhered part with the seam sealant and the method of sewing with the thread on the adhered part so as to improve an airtightness and a mechanical property of the adhered part.

Although an additional sealing process is not executed on the sewed area of the adhered part, the gas is not discharged very much from the adhered part.

The adhered part may be sewed with a thread comprising at least one selected from the group consisting of nylon fiber, polyester fiber, and p-aramid fiber. Especially, considering thermal resistance and contractibility, the thread preferably comprises Nylon 66 fiber, Nylon 46 fiber, and Heraclon® (p-aramid) fiber, and more preferably Nylon 66 fiber.

The adhered part may be sewed with the thread having 420 to 1260 deniers, and preferably 840 to 1260 deniers. Considering strength and elasticity, it is most preferable to use the thread having 1260 denier.

The thread is preferable to have a tensile strength of 58N ore more measured by ASTM (American Society for Testing and Materials International) D 204-97, and more preferably 58N to 110N. According to one embodiment of the present invention, the thread having 1260 denier may have a tensile strength of 89N to 110N, and the thread having 840 deniers may have a tensile strength of 58N to 80N. In case that the tensile strength of the thread in the adhered part is less than the above range measured by ASTM D 204-97, the thread can be unsewed when the airbag spreads out because the strength of the sewed area is too weak. In case that the tensile strength of the thread in the adhered part is too high, the airbag fabric can be torn when the airbag spreads out because the strength of the sewed area is too strong.

Moreover, the adhered part in the side curtain airbag according to the present invention may be sewed with an efficient method according to purpose of the parts. For example, the method of sewing, such as single lock, double lock, single chain, and double chain and so on may be applied. The stitch number is preferably 30 stitches/100 mm to 55 stitches/100 mm, and more preferably 40 stitches/100 mm to 50 stitches/100 mm. In case that the stitch number is less than 30 stitches/100 mm, the thread can be unsewed when the airbag spreads out because the strength of the sewed area is too weak. In case that stitch number is more than 55 stitches/100 mm, the airbag fabric can be torn when the airbag spreads out because the strength of the sewed area is too strong. In addition, because of the high strength of the sewed area, the fabric of the airbag can be distorted, and the efficiency of the sewing process can be lowered.

The side curtain airbag according to the present invention may be prepared with ordinary weaving process, scouring, heat setting process, and cutting process except for coating with the seam sealant and sewing with the thread on the adhered part.

Especially, a method for preparation of the side curtain airbag of the present invention may comprise weaving the inflating part having gas inflation and the non-inflating part supporting the inflating part into the airbag fabric; after coating the seam sealant on the inside of one airbag fabric which is the upper fabric or the lower fabric of the airbag, forming the adhered part in a method of compressing one airbag fabric coated with seal sealant and the other fabric, which is not coated, and curing; and sewing the adhered part.

In the preparation method of the present invention, the airbag may be prepared by coating the seam sealant, compressing, and curing after cutting with laser or the others. Alternatively, the side curtain airbag may be prepared in a method of cutting with laser or the others after compressing one airbag fabric coated with seam sealant and the other fabric, which is not coated, and curing. However, in case of performing the cutting step with laser at the final step of the process, it may lower the yield and have difficulty to cut in the exact site. Therefore, it is more preferable that the cutting step is performed before coating the seam sealant, compressing, and curing.

The side curtain airbag according to the present invention can keep an internal gas pressure to the extent of protecting passengers safely at rollover. The initial maximum pressure of the inflating part is 40 kPa or more when injecting a gas therein with an instant pressure of at least 10 bar, for example, 25 bar and the pressure after 6 seconds is 25 kPa or more. Thus, it can display the function as the side curtain airbag at rollover. More preferably, the side curtain airbag according to the present invention has an excellent ability that the rate of keeping internal gas pressure after 6 seconds is 50% or more.

Figure 3:
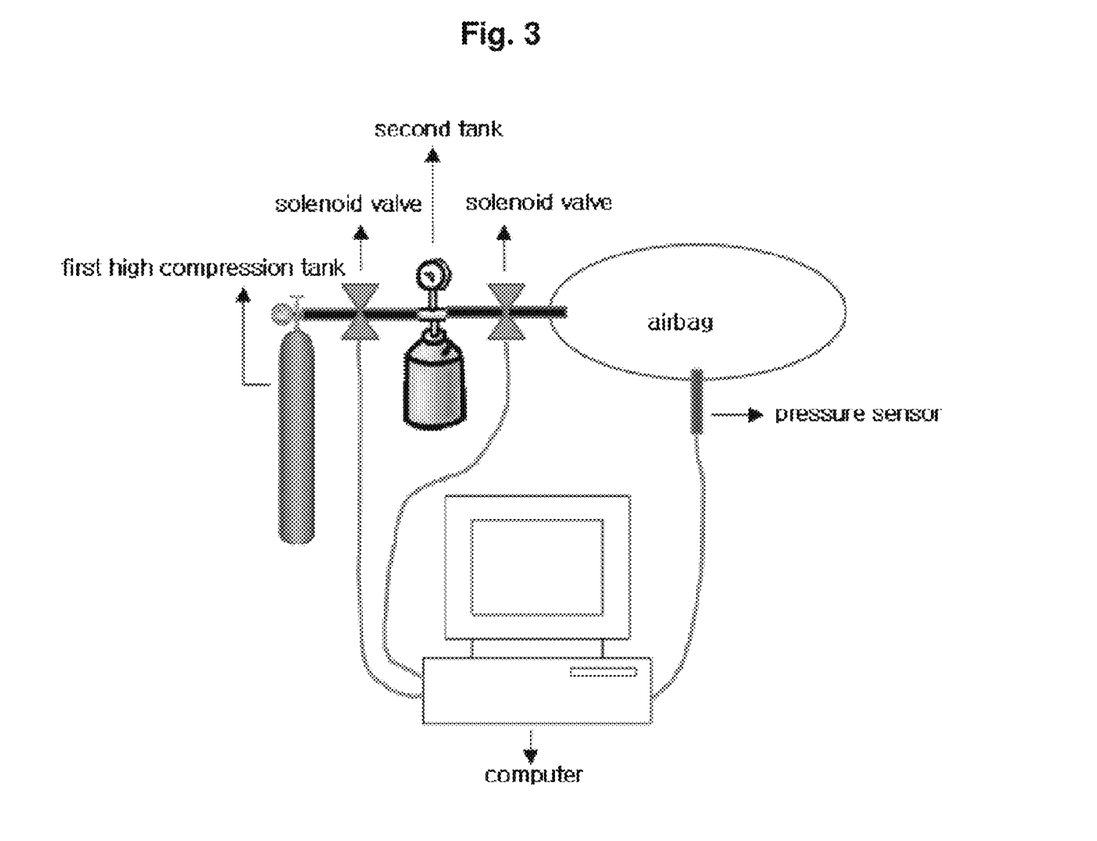
FIG. 3 shows a schematic view of an apparatus for measuring internal gas pressure of the side curtain airbag according to an embodiment of the present invention.

In one preferable embodiment of the present invention, the internal gas pressure of the airbag may be measured with the device in FIG. 3. In the measurement device, the first solenoid valve is opened by computer so that the second tank is filled up with nitrogen gas to the extent of at least 10 bar, for example, 25 bar after filling up the first highly-compressed tank with nitrogen. The first solenoid valve is closed after the second tank is filled up, and the second solenoid valve is opened by the computer. And then, the compressed nitrogen gas, which is filled up in at least 10 bar, for example, 25 bar, swiftly migrates to the airbag maintaining atmospheric pressure. Thus, the airbag spreads out. The initial maximum pressure of the airbag is measured by a pressure sensor, and the result is transferred to the computer. Some seconds after that, the pressure is measured again, and the result is recorded by computer.

Moreover, in order to prevent a burst when the airbag spreads out by a high-temperature and high-pressure of inflate, it is preferable that a seam strength of the side curtain airbag according to the present invention, which is measured in ASTM D 5822, is 1000N or more and a breaking elongation is 40% or more. Especially, the side curtain airbag according to the present invention keeps 90% or more of interfacial adhesion between the surface coated with the rubber material and the surface coated with the seam sealant. Thus, it minimizes the amount of air discharged through the adhered part at spreading out of the airbag and gets an excellent ability of keeping the internal gas pressure of the airbag.

The side curtain airbag according to the present invention as explained above, can prevents passengers from being injured by side windows or car frames at rollover and has the better ability to keep the internal gas pressure although it does not comprise a double fabric using the jacquard loom with a complicated structure.

On the other hand, the present invention provides an airbag system comprising the side curtain airbag. The airbag system may have the usual device that is well-known to the people skilled in the art The matters except that disclosed above are not particularly limited because they may be added or subtracted according to the necessity in the present invention.

The present invention is further described and illustrated in Examples provided below, which are, however, not intended to limit the scope of the present invention.

EXAMPLES

Physical properties of the side curtain airbag according to the present invention were measured as follows.

a) Measurement for Internal Gas Pressure of the Side Curtain Airbag.

As illustrated in FIG. 3, change in the gas pressure of the airbag was measured according to a time slot after inflating the airbag by injecting compressed nitrogen gas of 25 bar therein as air. An electronic control device was used here in order to control the operations of injecting and blocking air, because it is preferable to minimize an error by controlling the operations electronically.

b) Seam strength: ASTM (American Society for Testing and Materials International) D 5822

Example 1

The fabric for the airbag was prepared as follows. The plain fabric for the airbag was weaved with Nylon 66 fiber having 420 denier and a density of 49×49 (weft×warp) in a Rapier loom. After that, the non-coating fabric, which went through scouring and heat setting process, was coated with two-component liquid type of silicone rubber by knife over roll coating method. The amount of the rubber material coated on the non-coating fabric was 20 g/m$^2$ The fabric for the airbag was cut with laser cutter into the upper and lower fabric having a shape of airbag cushion. One of the fabrics above, which was the lower fabric of the airbag, was coated with the seam sealant on the adhered part constituting a boundary between the inflating part and the non-inflating part. In the coating method, 3-axis automatic robot dispensing system was used and the amount of the seam sealant coated on the adhered part was 45 g/m$^2$. The seam sealant was two-component liquid type of room temperature vulcanizable silicone resin (Tensile Strength: 4.2 MPa or more, Elongation: 1,200% or more, Curing Time: 24 hr at 25° C. and 65% RH, Viscosity: 200,000-240,000 cps, Pot Life: 60 min). The coating thickness of the seam sealant was 1 mm, and the coating width was 10 mm. It was intended to be a uniform coating throughout the adhered part.

After compressing the lower fabric of the airbag comprising the adhered part coated with seam sealant and the upper fabric of the airbag which is not coated with seam sealant, they were cured for 24 hours at room temperature. And then, the side curtain airbag was prepared by sewing in Single lock with Nylon 66 thread (ASTM D 204-97 106N, 1260 Denier) and the stitch number of 45 stitches/100 mm.

The measurement result according to the above method was that the initial maximum pressure of the inflating part was 99 kPa when injecting a gas therein with an instant pressure of 25 bar, and the pressure after 6 seconds was 75 kPa. The rate of keeping the internal gas pressure after 6 seconds was 75.8%, and the seam strength measured in the above way was 1750N.

Example 2

The side curtain airbag was prepared according to the same method as in Example 1, except that the coating amount of two-component liquid type of room temperature vulcanizable silicone resin on the lower fabric was 60 g/m$^2$ and the fabrics was cured for 24 hours at room temperature after compressing the upper and the coated lower fabric.

The measurement result according to the above method was that the initial maximum pressure of the inflating part was 103 kPa when injecting a gas therein with an instant pressure of 25 bar, and the pressure after 6 seconds was 82 kPa. The rate of keeping the internal gas pressure after 6 seconds was 79.6%, and the seam strength measured in the above way was 1815N.

Example 3

The side curtain airbag was prepared according to the same method as in Example 1, except that the coating amount of two component liquid type of room temperature vulcanizable silicone resin on the lower fabric was 75 g/m$^2$ and the fabrics was cured for 24 hours at room temperature after compressing the upper and the coated lower fabric.

The measurement result according to the above method was that the initial maximum pressure of the inflating part was 108 kPa when injecting a gas therein with an instant pressure of 25 bar, and the pressure after 6 seconds was 88 kPa. The rate of keeping the internal gas pressure after 6 seconds was 81.5%, and the seam strength measured in the above way was 1870N.

Example 4

The side curtain airbag was prepared according to the same method as in Example 1, except that the coating amount of the silicone rubber on the non-coating fabric was 30 g/m$^2$.

The measurement result according to the above method was that the initial maximum pressure of the inflating part was 104 kPa when injecting a gas therein with an instant pressure of 25 bar, and the pressure after 6 seconds was 82 kPa. The rate of keeping the internal gas pressure after 6 seconds was 78.8%, and the seam strength measured in the above way was 1825 N.

Example 5

The side curtain airbag was prepared according to the same method as in Example 1, except that the coating amount of the silicone rubber on the non-coating fabric was 40 g/m$^2$.

The measurement result according to the above method was that the initial maximum pressure of the inflating part was 106 kPa when injecting a gas therein with an instant pressure of 25 bar, and the pressure after 6 seconds was 85 kPa. The rate of keeping the internal gas pressure after 6 seconds was 80.2%, and the seam strength measured in the above way was 1850 N.

Example 6

The side curtain airbag was prepared according to the same method as in Example 1, except that the plain fabric for the airbag was weaved with Nylon 66 fiber having 315 denier and a density of 49×49 (weft×warp) in a Rapier loom.

The measurement result according to the above method was that the initial maximum pressure of the inflating part was 78 kPa when injecting a gas therein with an instant pressure of 25 bar, and the pressure after 6 seconds was 39 kPa. The rate of keeping the internal gas pressure after 6 seconds was 50%, and the seam strength measured in the above way was 1620 N.

Example 7

The side curtain airbag was prepared according to the same method as in Example 1, except that the plain fabric for the airbag was weaved with Nylon 66 fiber having 315 denier and a density of 60×60 (weft×warp) in a Rapier loom and the coating amount of two component liquid type of room temperature vulcanizable silicone resin on the lower fabric was 60 g/m$^2$.

The measurement result according to the above method was that the initial maximum pressure of the inflating part was 82 kPa when injecting a gas therein with an instant pressure of 25 bar, and the pressure after 6 seconds was 43 kPa. The rate of keeping the internal gas pressure after 6 seconds was 52.4%, and the seam strength measured in the above way was 1655 N.

Example 8

The side curtain airbag was prepared according to the same method as in Example 1, except that the plain fabric for the airbag was weaved with Nylon 66 fiber having 315 denier and a density of 60×60 (weft×warp) in a Rapier loom and the coating amount of two component liquid type of room temperature vulcanizable silicone resin on the lower fabric was 75 g/m².

The measurement result according to the above method was that the initial maximum pressure of the inflating part was 86 kPa when injecting a gas therein with an instant pressure of 25 bar, and the pressure after 6 seconds was 47 kPa. The rate of keeping the internal gas pressure after 6 seconds was 54.7%, and the seam strength measured in the above way was 1687 N.

Example 9

The fabric for the airbag was prepared as follows. The plain fabric for the airbag was weaved with Nylon 66 fiber having 420 denier and a density of 49×49 (weft×warp) in a Rapier loom. After that, the non-coating fabric, which went through scouring and heat setting process, was coated with two-component liquid type of silicone rubber by knife over roll coating method. The amount of the rubber material coated on the non-coating fabric was 20 g/m².

The lower fabric of the airbag was coated with the seam sealant on the adhered part constituting a boundary between the inflating part and the non-inflating part. In the coating method, 3-axis automatic robot dispensing system was used and the amount of the seam sealant coated on the adhered part was 45 g/m². The seam sealant was two component liquid type of room temperature vulcanizable silicone resin. The coating thickness of the seam sealant was 1 mm, and the coating width was 10 mm. It was intended to be a uniform coating throughout the adhered part.

After compressing the lower fabric of the airbag comprising the adhered part coated with seam sealant and the upper fabric of the airbag which is not coated with seam sealant, they were cured for 24 hours at room temperature. And then, the side curtain airbag was sewed in Single lock with Nylon 66 thread (ASTM D 204-97 106N, 1260 Denier) and the stitch number of 45 stitches/100 mm. The sewed airbag fabric was cut with laser cutter into a shape of airbag cushion and the side curtain airbag was prepared.

The measurement result according to the above method was that the initial maximum pressure of the inflating part was 99 kPa when injecting a gas therein with an instant pressure of 25 bar, and the pressure after 6 seconds was 75 kPa. The rate of keeping the internal gas pressure after 6 seconds was 75.8%, and the seam strength measured in the above way was 1750 N.

Comparative Example 1

The fabric for the side curtain airbag was weaved with Nylon 66 fiber having 420 denier and a density of 57×49 (weft×warp) in a Jacquard loom, so that the fabric had inflating part and non-inflating part in a single piece from the weaving step. After that, the non-coating fabric, which went through scouring and heat setting process, was coated with two-component liquid type of silicone rubber by knife over roll coating method. The amount of the rubber material coated on the non-coating fabric was 75 g/m²

The measurement result according to the above method was that the initial maximum pressure of the inflating part was 96 kPa when injecting a gas therein with an instant pressure of 25 bar, and the pressure after 6 seconds was 68 kPa. The rate of keeping the internal gas pressure after 6 seconds was 70.8%, and the seam strength measured in the above way was 1650 N.

Comparative Example 2

The side curtain airbag was prepared according to the same method as in Comparative Example 1, except that the coating amount of the silicone rubber on the non-coating fabric was 95 g/m².

The measurement result according to the above method was that the initial maximum pressure of the inflating part was 98 kPa when injecting a gas therein with an instant pressure of 25 bar, and the pressure after 6 seconds was 71 kPa. The rate of keeping the internal gas pressure after 6 seconds was 72.4%, and the seam strength measured in the above way was 1685 N.

Comparative Example 3

The side curtain airbag was prepared according to the same method as in Comparative Example 1, except that the fabric was weaved with Nylon 66 fiber having 315 denier and a density of 60×60 (weft×warp) in a Jacquard loom and the fabric was weaved so that it had inflating part and non-inflating part in a single piece from the weaving step. The coating amount of two-component liquid type of silicone rubber on the non-coating fabric was 75 g/m².

The measurement result according to the above method was that the initial maximum pressure of the inflating part was 74 kPa when injecting a gas therein with an instant pressure of 25 bar, and the pressure after 6 seconds was 33 kPa. The rate of keeping the internal gas pressure after 6 seconds was 44.6%, and the seam strength measured in the above way was 1320 N.

Comparative Example 4

The side curtain airbag was prepared according to the same method as in Comparative Example 1, except that the fabric was weaved with Nylon 66 fiber having 315 denier and a density of 60×60 (weft×warp) in a Jacquard loom and the coating amount of two-component liquid type of silicone rubber on the non-coating fabric was 95 g/m².

The measurement result according to the above method was that the initial maximum pressure of the inflating part was 76 kPa when injecting a gas therein with an instant pressure of 25 bar, and the pressure after 6 seconds was 35 kPa. The rate of keeping the internal gas pressure after 6 seconds was 46.1%, and the seam strength measured in the above way was 1350 N.

The measurement results of internal gas pressure and seam strength of the airbag according to Examples 1 to 9 and Comparative Examples 1 to 4 were shown in the following Table 1.

TABLE 1

| | Fineness (De) | Amount of silicone (g/m$^2$) | Amount of seam sealant (g/m$^2$) | Initial maximum pressure (kPa) | Pressure after 6 seconds (kPa) | Rate of keeping internal gas pressure (%) | Seam strength (N) | Note |
|---|---|---|---|---|---|---|---|---|
| E. 1 | 420 | 20 | 45 | 99 | 75 | 75.8 | 1750 | Seam sealant/Rapier loom |
| E. 2 | 420 | 20 | 60 | 103 | 82 | 79.6 | 1815 | Seam sealant/Rapier loom |
| E. 3 | 420 | 20 | 75 | 108 | 88 | 81.5 | 1870 | Seam sealant/Rapier loom |
| E. 4 | 420 | 30 | 45 | 104 | 82 | 78.8 | 1825 | Seam sealant/Rapier loom |
| E. 5 | 420 | 40 | 45 | 106 | 85 | 80.2 | 1850 | Seam sealant/Rapier loom |
| E. 6 | 315 | 20 | 45 | 78 | 39 | 50.0 | 1620 | Seam sealant/Rapier loom |
| E. 7 | 315 | 20 | 60 | 82 | 43 | 52.4 | 1655 | Seam sealant/Rapier loom |
| E. 8 | 315 | 20 | 75 | 86 | 47 | 54.7 | 1687 | Seam sealant/Rapier loom |
| E. 9 | 420 | 20 | 45 | 99 | 75 | 75.8 | 1750 | Seam sealant/Rapier loom |
| C.E 1 | 420 | 75 | — | 96 | 68 | 70.8 | 1650 | OPW (Jacquard loom) |
| C.E 2 | 420 | 95 | — | 98 | 71 | 72.4 | 1685 | OPW (Jacquard loom) |
| C.E. 3 | 315 | 75 | — | 74 | 33 | 44.6 | 1320 | OPW (Jacquard loom) |
| C.E. 4 | 315 | 95 | — | 76 | 35 | 46.1 | 1350 | OPW (Jacquard loom) |

* E.: Example, C.E.: Comparative Example

As shown in Table 1, the seam sealing types of side curtain airbags according to Examples 1 to 5 and 9, which are prepared with Nylon 66 fiber having 420 denier, show good seam strength and rate of keeping the internal gas pressure after 6 seconds, comparing to the side curtain airbags according to Comparative Examples 1 and 2, which are prepared with the same Nylon 66 fiber having 420 denier. Moreover, the seam sealing type of side curtain airbag according to Examples 6 to 8, which is prepared with Nylon 66 fiber having 315 denier, shows good seam strength and rate of keeping internal gas pressure after 6 seconds, comparing to the side curtain airbag according to comparative Examples 3 and 4, prepared with the same Nylon 66 fiber having 315 denier. Thus, the seam sealing type of side curtain airbag according to the present invention has an excellent airtightness and maintenance of the strength at spreading out.

Furthermore, although the side curtain airbag according to Examples 1 to 9 is not OPW (One Piece Woven) type according to the Comparative Examples 1 to 4 which requires an expensive jacquard loom with complicated structure, it can provide the excellent abilities of keeping the internal gas pressure, lower the cost for preparation, and simplify the preparing process by applying the seam sealant coating and sewing method.

On the other hand, the side curtain airbag in Example 9, which is prepared with cutting after coating the airbag fabric with seam sealant, curing, and sewing, has the same capacity as the side curtain airbag in Example 1, which is prepared with cutting before coating the airbag fabric with seam sealant, curing, and sewing. Thus, the side curtain airbag according to the present invention has an advantage in preparing process because the process can be easily changed depending on the efficiency of whole process.

As stated above, the side curtain airbag of the present invention applies the plain fabric and optimizes the method of seam sealant coating and sewing on the adhered part between the inflating part and the non-inflating part. Thus, the side curtain airbag according to the present invention improves air tightness at spreading out of the air bag and a property of keeping the internal gas pressure of the airbag. Moreover, an additional sealing process on the adhered part and a jacquard loom with complicated structure are not necessary. Thus, it can simplify the process and lower the cost for preparation.

Example 10

The fabric for the airbag was prepared as follows. The plain fabric for the airbag was weaved with Nylon 66 fiber having 420 denier and a density of 49×49 (weft×warp) in a Rapier loom. After that, the non-coating fabric, which went through scouring and heat setting process, was coated with two-component liquid type of silicone rubber by knife over roll coating method. The amount of the rubber material coated on the non-coating fabric was 35 g/m$^2$ The fabric for the airbag was cut with laser cutter into the upper and lower fabric having a shape of airbag cushion. One of the fabrics above, which was the lower fabric of the airbag, was coated with the seam sealant on the adhered part constituting a boundary between the inflating part and the non-inflating part. In the coating method, 3-axis automatic robot dispensing system was used and the amount of the seam sealant coated on the adhered part was 45 g/m$^2$. The seam sealant was two-component liquid type of room temperature vulcanizable silicone resin (Tensile Strength: 4.2 MPa or more, Elongation: 1,200% or more, Curing Time: 24 hr at 25° C. and 65% RH, Viscosity: 200,000-240,000 cps, Pot Life: 60 min). The coating thickness of the seam sealant was 1 mm, and the coating width was 10 mm. It was intended to be a uniform coating throughout the adhered part.

After compressing the lower fabric of the airbag comprising the adhered part coated with seam sealant and the upper fabric of the airbag which is not coated with seam sealant, they were cured for 24 hours at room temperature. And then, the side curtain airbag was prepared by sewing in Single lock with Nylon 66 thread (ASTM D 204-97 106N, 1260 Denier, 3ply) and the stitch number of 40 stitches/100 mm.

The internal gas pressure of the side curtain airbag was measured as follows. As illustrated in FIG. 3, change in the gas pressure of the airbag was measured according to a time slot after inflating the airbag by injecting compressed nitrogen gas of 25 bar therein as air. An electronic control device was used here in order to control the operations of injecting and blocking air, because it is preferable to minimize an error by controlling the operations electronically.

The measurement result according to the above method was that the initial maximum pressure of the inflating part was 99 kPa when injecting a gas therein with an instant pressure of 25 bar, and the pressure after 6 seconds was 75 kPa. The rate of keeping the internal gas pressure after 6 seconds was 75.8%, and the seam strength measured in the above way was 1750 N.

Comparative Example 5

The side curtain airbag was prepared according to the same method as in Example 10, except that the coating thickness of the seam sealant was 0.35 mm.

The internal gas pressure of the side curtain airbag was measured according to the above method.

Comparative Example 6

The side curtain airbag was prepared according to the same method as in Example 10, except that a seam tape was applied instead of the seam sealant and the seam thickness of the seam tape was 0.6 mm. Also, after compressing the lower fabric of the airbag comprising the adhered part applied with the seam tape and the upper fabric of the airbag which is not applied with the seam tape, they were cured for 10 min. at 85° C.

The internal gas pressure of the side curtain airbag was measured according to the above method.

Comparative Example 7

The side curtain airbag was prepared according to the same method as in Example 10, except that the seam thickness of the seam tape was 1.0 mm.

The internal gas pressure of the side curtain airbag was measured according to the above method.

Comparative Example 8

The side curtain airbag was prepared according to the same method as in Example 10, except that the seam thickness of the seam tape was 1.3 mm.

The internal gas pressure of the side curtain airbag was measured according to the above method.

The side curtain airbag of Example 10 and Comparative Examples 5 to 8 were prepared as shown in the following Table 2.

TABLE 2

| | Cushion | Plain Fabric | Coating Material | Sealing Type | Curing Condition | Seam Thickness (mm) | Sewing Stitch (stiches/ 100 mm) | Sewing Thread |
|---|---|---|---|---|---|---|---|---|
| E. 10 | CAB | N66 420D 49 × 49 35 g/m$^2$ | LSR (Liquid Silicone Rubber) | Seam Sealant | 25° C. × 24 hrs | 1.0 | 40 | Upper & Lower Thread: N66 1260D/ 3ply |
| C.E. 5 | | | | | | 0.35 | 40 | |
| C.E. 6 | | | | Seam Tape | 85° C. × 10 min | 0.6 | 40 | |
| C.E. 7 | | | | | | 1.0 | 40 | |
| C.E. 8 | | | | | | 1.3 | 40 | |

* E.: Example, C.E.: Comparative Example

The internal gas pressure of the side curtain airbag according to Example 10 and Comparative Examples 5 to 8 were measured in four times, respectively. The measurement results of internal gas pressure according to the above were shown in the following Table 3 (air pressure retention data).

TABLE 3

|  | Initial Max. Pressure (kPa) | Pressure (kPa) after 6 sec. | Air Pressure Retention Ratio(%) | Test Condition | Test Specification |
| --- | --- | --- | --- | --- | --- |
| Example 10 | 116.3 | 100.6 | 86.5 | Room Temp. (25° C.) | Pass |
|  | 115.8 | 98.5 | 85.1 |  | Pass |
|  | 113.6 | 99.7 | 87.8 |  | Pass |
|  | 112.5 | 98.9 | 87.9 |  | Pass |
| Comparative Example 5 | 93.5 | 16.5 | 17.6 |  | Fail |
|  | 95.4 | 16.2 | 17.0 |  | Fail |
|  | 95.3 | 17.3 | 18.2 |  | Fail |
|  | 93.8 | 15.8 | 16.8 |  | Fail |
| Comparative Example 6 | 82.4 | 5.5 | 6.7 |  | Fail |
|  | 84.1 | 5.6 | 6.7 |  | Fail |
|  | 85.7 | 4.3 | 5.0 |  | Fail |
|  | 84.6 | 6.2 | 7.3 |  | Fail |
| Comparative Example 7 | 89.5 | 8.5 | 9.5 |  | Fail |
|  | 88.2 | 8.8 | 10.0 |  | Fail |
|  | 88.3 | 9.0 | 10.2 |  | Fail |
|  | 89.2 | 7.8 | 8.7 |  | Fail |
| Comparative Example 8 | 95.5 | 14.0 | 14.7 |  | Fail |
|  | 97.2 | 13.2 | 13.6 |  | Fail |
|  | 96.4 | 13.6 | 14.1 |  | Fail |
|  | 96.8 | 13.8 | 14.3 |  | Fail |

Input Pressure (25 bar, Inflating source: compressed N2 Gas)
Airbag cushion volume: 35 L As shown in Table 3, the side curtain airbags according to Example 10, which is prepared with the optimized thickness of the seam sealant, shows good seam strength and rate of keeping the internal gas pressure after 6 seconds, comparing to the side curtain airbags according to Comparative Examples 5 to 8, prepared with the seam tape or beyond the optimized seam thickness ranges.

Example 11

The fabric for the airbag was prepared as follows. The plain fabric for the airbag was weaved with Nylon 66 fiber having 420 denier and a density of 49×49 (weft×warp) in a Rapier loom. After that, the non-coating fabric, which went through scouring and heat setting process, was coated with two-component liquid type of silicone rubber by knife over roll coating method. The amount of the rubber material coated on the non-coating fabric was 35 g/m²

The fabric for the airbag was cut with laser cutter into the upper and lower fabric having a shape of airbag cushion. One of the fabrics above, which was the lower fabric of the airbag, was coated with the seam sealant on the adhered part constituting a boundary between the inflating part and the non-inflating part. In the coating method, 3-axis automatic robot dispensing system was used and the amount of the seam sealant coated on the adhered part was 45 g/m². The seam sealant was two-component liquid type of room temperature vulcanizable silicone resin (Tensile Strength: 4.2 MPa or more, Elongation: 1,200% or more, Curing Time: 24 hr at 25° C. and 65% RH, Viscosity: 200,000-240,000 cps, Pot Life: 60 min). The coating thickness of the seam sealant was 1 mm, and the coating width was 10 mm. It was intended to be a uniform coating throughout the adhered part.

After compressing the lower fabric of the airbag comprising the adhered part coated with seam sealant and the upper fabric of the airbag which is not coated with seam sealant, they were cured for 24 hours at room temperature. And then, the side curtain airbag was prepared by sewing in Single lock with Nylon 66 thread (ASTM D 204-97 106N, 1260 Denier, 3ply) and the stitch number of 40 stitches/100 mm.

The internal gas pressure of the side curtain airbag was measured as follows. As illustrated in FIG. 3, change in the gas pressure of the airbag was measured according to a time slot after inflating the airbag by injecting compressed nitrogen gas of 25 bar therein as air. An electronic control device was used here in order to control the operations of injecting and blocking air, because it is preferable to minimize an error by controlling the operations electronically.

The measurement result according to the above method was that the initial maximum pressure of the inflating part was 99 kPa when injecting a gas therein with an instant pressure of 25 bar, and the pressure after 6 seconds was 75 kPa. The rate of keeping the internal gas pressure after 6 seconds was 75.8%, and the seam strength measured in the above way was 1750 N.

Comparative Examples 9 to 12

The side curtain airbags were prepared according to the same method as in Example 11, except that of the seam sealant components and curing process were applied, respectively, as shown in the following Table 4.

The side curtain airbag of Example 11 and Comparative Examples 9 to 12 were prepared as shown in the following Table 4.

TABLE 4

|  | Cushion | Plain Fabric | Coating Material | Seam Sealing Material | Seam Sealing Material Component | Curing Condition | Sealing material Polymerization during curing process | Sewing Thread |
| --- | --- | --- | --- | --- | --- | --- | --- | --- |
| E. 11 | CAB | N66 420D 49 × 49 35 g/m² | LSR (Liquid Silicone Rubber) | Sealant | Two Liquid type | 25° C. × 24 hrs | Addition | Upper & Lower Thread: N66 1260D/ 3ply |
| C.E. 9 |  |  | RTV | Two Liquid type | 25° C. × 2 hrs | Addition |  |
| C.E. 10 |  |  |  | RTV | One Liquid Type | 25° C. × 7 hr | Condensation |  |
| C.E. 11 |  |  |  | RTV | Two Liquid type | 25° C. × 24 hrs | Condensation |  |
| C.E. 12 |  |  |  | RTV | Two Liquid type | 160° C. × 10 min | Addition |  |

* E.: Example, C.E.: Comparative Example
* RTV: Room Temperature Vulcanized Silicone Rubber The internal gas pressure of the side curtain airbag according to Example 11 and Comparative Examples 9 to 12 were measured in four times, respectively. The measurement results of internal gas pressure according to the above were shown in the following Table 5 (air pressure retention data).

TABLE 5

|  | Initial Max. Pressure (kPa) | Pressure (kPa) after 6 sec. | Air Pressure Retention Ratio(%) | Test Condition | Test Specification |
|---|---|---|---|---|---|
| Example 11 | 118.6 | 101.6 | 85.7 | Room Temp. (25° C.) | Pass |
|  | 117.5 | 100.3 | 85.4 |  | Pass |
|  | 116.9 | 102.3 | 87.5 |  | Pass |
|  | 118.5 | 99.8 | 84.2 |  | Pass |
| Comparative Example 9 | 83.5 | 5.3 | 6.3 |  | Fail |
|  | 84.3 | 5.1 | 6.0 |  | Fail |
|  | 86.5 | 4.8 | 5.5 |  | Fail |
|  | 83.8 | 4.9 | 5.8 |  | Fail |
| Comparative Example 10 | 82.4 | 10.3 | 12.5 |  | Fail |
|  | 84.1 | 11.2 | 13.3 |  | Fail |
|  | 85.7 | 10.8 | 12.6 |  | Fail |
|  | 84.6 | 11.4 | 13.5 |  | Fail |
| Comparative Example 11 | 86.4 | 10.3 | 11.9 |  | Fail |
|  | 88.2 | 11.4 | 12.9 |  | Fail |
|  | 88.3 | 10.6 | 12.0 |  | Fail |
|  | 87.6 | 10.6 | 12.1 |  | Fail |
| Comparative Example 12 | 85.5 | 13.2 | 15.4 |  | Fail |
|  | 86.4 | 12.5 | 14.5 |  | Fail |
|  | 84.6 | 12.6 | 14.9 |  | Fail |
|  | 84.8 | 13.2 | 15.6 |  | Fail |

Input Pressure (25 bar, Inflating source: compressed N2 Gas)
Airbag cushion volume: 35 L As shown in Table 5, the side curtain airbags according to Example 11, which is prepared with the seam sealant component, shows good seam strength and rate of keeping the internal gas pressure after 6 seconds, comparing to the side curtain airbags according to Comparative Examples 9 to 12.

While the present invention has been described in detail with reference to the preferred embodiments, those skilled in the art will appreciate that various modifications and substitutions can be made thereto without departing from the spirit and scope of the present invention as set forth in the appended claims.

What is claimed:

1. A side curtain airbag comprising:
   an inflating part having gas inflation;
   a non-inflating part supporting the inflating part; and
   an adhered part constituting a boundary between the inflating part and the non-inflating part,
   wherein the adhered part is coated with a seam sealant in the amount of 45 g/m² to 110 g/m² to have a thickness in range of 0.5 mm to 1.0 mm and a width in range of 8 mm to 10 mm, and sewed with a thread having 840 to 1260 deniers to have a stitch number in range of 40 stitches/100 mm to 50 stitches/100 mm,
   wherein the seam sealant is room temperature vulcanizable and is a two-component liquid and the seam sealant comprises a room temperature vulcanizable silicone resin,
   wherein the tensile strength of the seam sealant is at least 4 MPa, the elongation of the seam sealant is at least 1,000%, the viscosity of the seam sealant is 170,000 to 250,000 cps, the pot life of the seam sealant is 40 to 80 min, and the curing time of the seam sealant is 18 to 30 hr at room temperature, and
   wherein the initial maximum pressure of the inflating part is 40 kPa or more when injecting a gas therein with an instant pressure of at least 10 bar, and the pressure after 6 seconds is 25 kPa or more.

2. The side curtain airbag of claim 1, which is made of at least one fabric selected from the group consisting of nylon fabric, polyester fabric, polyphenylene sulfide fabric, polyethylene 2,6-naphthalate fabric, and aramid fabric.

3. The side curtain airbag of claim 2, wherein the fabric is coated with a rubber material selected from the group consisting of powder silicone, liquid silicone, and a mixture thereof.

4. The side curtain airbag of claim 3, wherein the amount of the rubber material coated on the fabric is 20 g/m² to 100 g/m².

5. The side curtain airbag of claim 1, wherein the adhered part is sewed with a thread comprising at least one selected from the group consisting of nylon fiber, polyester fiber, and p-aramid fiber.

6. An airbag system comprising the side curtain airbag according to claim 1.

7. The airbag system of claim 6, wherein the side curtain airbag is made of at least one fabric selected from the group consisting of nylon fabric, polyester fabric, polyphenylene sulfide fabric, polyethylene 2,6-naphthalate fabric, and aramid fabric.

8. The airbag system of claim 7, wherein the fabric is coated with a rubber material selected from the group consisting of powder silicone, liquid silicone, and a mixture thereof.

9. The airbag system of claim 8, wherein the amount of the rubber material coated on the fabric is 20 g/m² to 100 g/m².

10. The airbag system of claim 6, wherein the seam sealant comprises room temperature vulcanizable silicone resin.

11. The airbag system of claim 6, wherein the adhered part is sewed with a thread comprising at least one selected from the group consisting of nylon fiber, polyester fiber, and p-aramid fiber.

* * * * *